United States Patent Office 3,555,400
Patented Jan. 12, 1971

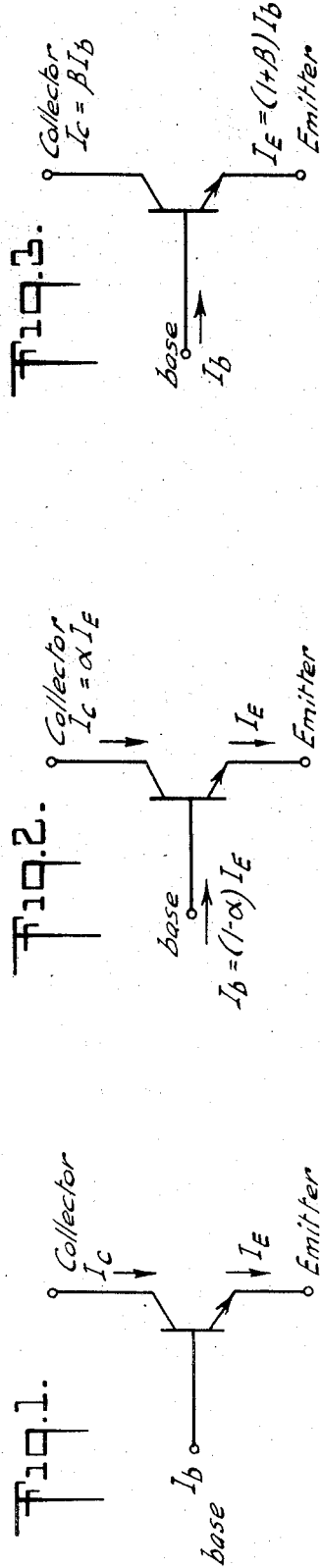
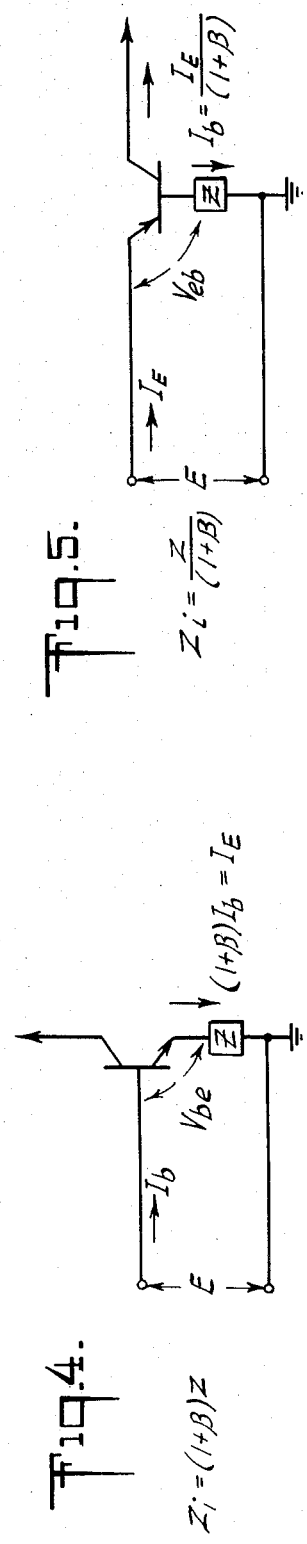

3,555,400
HIGH VOLTAGE REGULATOR USING IMPEDANCE TRANSFER CHARACTERISTICS OF TRANSISTORS
Robert A. Van Cleave, Jr., South Houston, Tex., assignor to Texaco Inc., New York, N.Y., a corporation of Delaware
Filed Aug. 21, 1968, Ser. No. 754,407
Int. Cl. G05f 1/56
U.S. Cl. 323—22          11 Claims

ABSTRACT OF THE DISCLOSURE

A high-voltage regulator employing a first PNP transistor connected in series between an input terminal and an output terminal of the regulator, the emitter of the first transistor being connected to the output terminal of the regulator. A second PNP transistor has its collector and emitter coupled with the collector and base, respectively, of the first transistor. Shunted across the output terminals of the voltage regulator is a resistive element, or series of them, across which is developed a regulated output voltage. Also shunted across the output terminals of the voltage regulator are a third transistor and a fourth transistor, the former being of the PNP type and the latter being of the NPN type. The emitters of the first, third and fourth transistors are coupled together. The collector of the third transistor is coupled with the base of the second transistor. The bases of the third and fourth transistors are coupled to the output resistive element. Also, the collector of the fourth transistor is coupled with the output resistive element. Coupled between the base of the fourth transistor and the other of the output terminals in a capacitor which is made to appear as a much larger capacitor than it actually is by virtue of the impedance transfer characteristics of the fourth transistor.

BACKGROUND OF THE INVENTION

This invention pertains, in general, to voltage regulators; and, more particularly, to a transistorized high voltage regulator using impedance transfer characteristics of the transistors in regulating voltages.

One important problem associated with the functioning of high voltage power supplies is the obtaining of enough capacity at high voltage levels. Sufficient capacity is needed at the high voltage levels to provide acceptable voltage regulation of the output voltages delivered by the power supply. Heretofore massive and expensive high-capacitance value capacitors were used to provide the required capacity at the high voltage levels.

SUMMARY OF THE INVENTION

A general object of the present invention is to provide new and improved voltage regulator circuitry.

Another object of the invention is to provide high-voltage voltage regulation circuitry employing impedance transfer characteristics of transistors to regulate the voltage.

Another object of the invention is to provide a high-voltage voltage regulator circuit wherein the capacitance of a low-capacitance high-voltage capacitor is, in effect, multiplied by a transistor to provide a large effective capacitance for the voltage regulation.

Another object of the invention is to provide a high-voltage voltage regulator circuit wherein the capacitance of a low-capacitance high-voltage capacitor is effectively multiplied by a transistor to provide a large effective capacitance for voltage regulation purposes thereby eliminating the need for employing a massive bulky and expensive capacitor heretofore used in high voltage regulation.

In accordance with an illustrative embodiment of the invention there is provided a high-voltage regulator circuit which utilizes the impedance transfer characteristics of a transistor to make a small-capacity high-voltage capacitor act in the circuit as a high-capacity high-voltage reactor.

Other objects of the invention as well as the many features and adavntages thereof will appear upon examination of the accompanying drawing together with the description, hereinafter set forth, of an embodiment of the invention which illustrates, but is not limitive of, the invention.

BRIEF DESCRIPTION OF THE DRAWING

FIG. 1 is a schematic diagram of an NPN transistor showing the various currents entering and leaving its electrodes, such schematic diagram being for the purpose of better illustrating the underlying principles of the voltage regulator according to the invention.

FIG. 2 is another schematic diagram of an NPN transistor, similar to that of FIG. 1, indiciating the relationships between base and collector currents as referred to emitter current.

FIG. 3 is another schematic diagram of an NPN transistor, similar to that shown in FIGS. 1 and 2, showing the relationships between emitter and collector currents as referred to the base current.

FIG. 4 is still another schematic diagram of an NPN transistor as connected in the emitter follower (common collector) configuration.

FIG. 5 is a schematic diagram of a PNP transistor as connected in the common base configuration.

FIG. 6 is a schematic representation showing a PNP transistor connected in the common base configuration together with a capacitor.

DETAILED DESCRIPTION OF THE INVENTION

Figure 7:
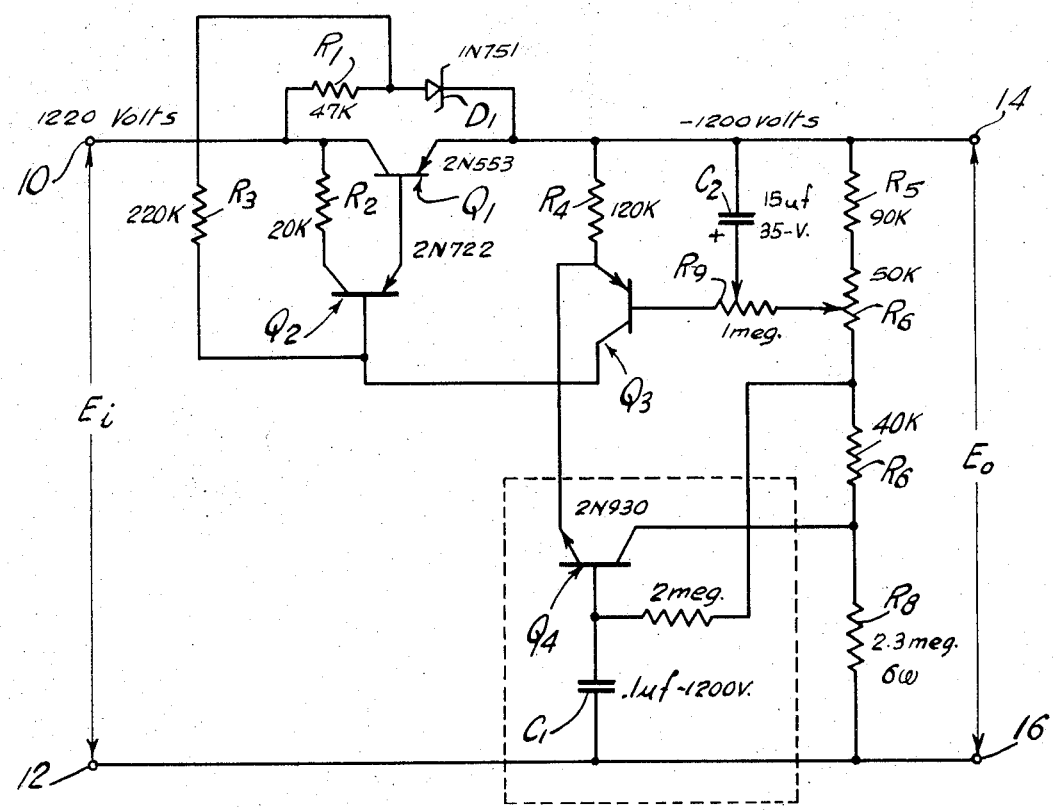
FIG. 7 is an illustrative embodiment of a voltage regulator in accordance with the present invention.

FIGS. 1 through 6 are for the purpose of aiding in explaining the underlying principles of the invention.

If the currents in the base, emitter, and collector electrodes of a transistor are defined as $I_b$, $I_E$, and $I_c$, respectively, FIG. 1 evolves, as shown the drawing.

In FIG. 1 the relationship $$I_b + I_c = I_E \quad \text{(Eq. 1)}$$

must hold to satisfy Kirchoff's second law, which states that the sum of currents flowing into a node equals the sum of currents flowing out.

Also, if that portion of the emitter current which passes from the collector is defined as $\alpha I_E$, then from Kirchoff's second law $I_b = (1-\alpha)I_E$.

$$I_b + \alpha I_E = I_E \quad \text{(Eq. 2)}$$

$$I_b = I_E - \alpha I_E \quad \text{(Eq. 3)}$$

$$I_b = (1-\alpha)I_E \quad \text{(Eq. 4)}$$

The relationships describing $I_b$, and $I_c$ referred to the emitter current ($I_E$) are depicted in FIG. 2.

Another useful set of relationships are those describing $I_c$ and $I_E$ referred to the base current $I_b$.

$$\frac{I_c}{I_b} = \frac{\alpha I_E}{(1-\alpha)I_E} \quad \text{(Eq. 5)}$$

$$\frac{I_c}{I_b} = \frac{\alpha}{1-\alpha} \quad \text{(Eq. 6)}$$

let $$\beta = \frac{\alpha}{1-\alpha} \quad \text{(Eq. 7)}$$

Here the relationship $$\frac{\alpha}{1-\alpha}$$

has been assigned the symbol $\beta$, therefore $$I_c = \beta I_b \quad \text{(Eq. 8)}$$

The relationship between $I_E$ and $I_b$ can be found:

$$\frac{I_E}{I_b} = \frac{I_E}{(1-\alpha)I_E} \quad \text{(Eq. 9)}$$

$$\frac{I_E}{I_b} = \frac{1}{(1-\alpha)} \quad \text{(Eq. 10)}$$

But from Kirchoff's law $$I_E = I_b + I_c \quad \text{(Eq. 1)}$$
$$I_E = I_b + \beta I_b \quad \text{(Eq. 11)}$$
$$I_E = (1+\beta)I_b \quad \text{(Eq. 12)}$$

from Eq. 10 and Eq. 12 the relationship $$1+\beta = \frac{1}{1-\alpha} \quad \text{(Eq. 13)}$$

is obtained. If Eq. 10 and 12 are valid then the expression for $\beta$ derived from Eq. 13 must be equal to that of Eq. 7. Rearranging terms the following relationships are derived:

$$\beta = \frac{1}{1-\alpha} - 1 \quad \text{(Eq. 14)}$$

$$\beta = \frac{1-1+\alpha}{1-\alpha} \quad \text{(Eq. 15)}$$

$$\beta = \frac{\alpha}{1-\alpha} \quad \text{(Eq. 16)}$$

Observing Eq. 7 and Eq. 16 and noting that they are indeed equals, verifies that both Eq. 10 and Eq. 12 are valid expressions for the relationship between $I_E$ and $I_b$.

The relationships describing $I_c$ and $I_E$ referred to the base current ($I_b$) are depicted in FIG. 3.

Furthermore, defining input impedence $Z_i$ as the change of input voltage $dV_i$ with respect to the change of input current $dI_i$ then $$\frac{dV_i}{dI_i} = Z_i \quad \text{(Eq. 17)}$$

the expression for the input impedance of an emitter follower, or common collector, configuration shown in FIG. 4 can be found.

As an approximation Eq. 17 can be written $$\frac{\Delta V_i}{\Delta I_i} = Z_i \quad \text{(Eq. 18)}$$

For the emitter follower circuit of FIG. 4

$$E_1 = V_{be} + ZI_{E1} \quad \text{(Eq. 19)}$$
$$E_2 = V_{be} + ZI_{E2} \quad \text{(Eq. 20)}$$
$$E_1 = V_{be} + (1+\beta)ZI_{b1} \quad \text{(Eq. 21)}$$
$$E_2 = V_{be} + (1+\beta)ZI_{b2} \quad \text{(Eq. 22)}$$
$$\Delta V_i = E_2 - E_1 \quad \text{(Eq. 23)}$$

where $E_1$ and $E_2$ are two different values of the input voltage E (or $V_i$) from base to ground as shown in FIG. 4; where $I_{E1}$ and $I_{E2}$ are two different values of emitters current; where $I_{b1}$ and $I_{b2}$ are two different values of base current; where Z as shown in FIG. 4 is the emitter to ground impedance; and where $V_{be}$, also shown in FIG. 4, is the base to emitter voltage. Furthermore, continuing on from Eq. 23

$$\Delta V_i = V_{be} + (1+\beta)ZI_{b2}$$
$$\qquad -V_{be} - (1+\beta)ZI_{b1} \quad \text{(Eq. 24)}$$
$$\Delta V_i = (1+\beta)Z[I_{b2} - I_{b1}] \quad \text{(Eq. 25)}$$

but $$I_{b2} - I_{b1} = \Delta I_i \quad \text{(Eq. 26)}$$

$$Z_i = \frac{\Delta V_i}{\Delta I_i} = (1+\beta)Z \quad \text{(Eq. 27)}$$

It is observed that the emitter follower configuration (FIG. 4) exhibits an impedence transfer characteristic which reflects the emitter impedance multiplied by the factor $(1+\beta)$ back to the input base terminal.

Utilizing Eq. 17 and FIG. 5, depicting a transistor in the common base configuration, the input impedance $Z_i$ of the common base configuration can be found.

$$E_1 = V_{eb} + I_{b_1}Z \quad \text{(Eq. 28)}$$
$$E_2 = V_{eb} + I_{b_2}Z \quad \text{(Eq. 29)}$$

$$E_1 = V_{eb} + \frac{I_{E_1}}{(1+\beta)} Z \quad \text{(Eq. 30)}$$

$$E_2 = V_{eb} + \frac{I_{E_2}}{(1+\beta)} Z \quad \text{(Eq. 31)}$$

$$E_2 - E_1 = \frac{Z}{(1+\beta)} [I_{E_2} - I_{E_1}] \quad \text{(Eq. 32)}$$

but $\Delta V_i = E_2 - E_1$ and $\Delta I_i = I_{E_2} - I_{E_1}$ (Eq. 23 and 26)

$$Z_i = \frac{\Delta V_i}{\Delta I_i} = \frac{Z}{(1+\beta)} \quad \text{(Eq. 33)}$$

It is observed that the common base configuration (FIG. 5) exhibits an impedance transfer characteristic which reflects the base impedance divided by the factor $(1+\beta)$ back to the input emitter terminal.

One of the problems involved in building a high voltage power supply is that of obtaining enough capacity at high voltage levels.

The impedance transfer characteristic of the transistor may be used to effectively increase capacity.

From Eq. 33, the expression for the input impedance of a common base configuration is $$Z_i = \frac{Z}{(1+\beta)} \quad \text{Eq. 33)}$$

but from FIG. 6 where the capacitor c is used $$Z = \frac{1}{sc} \quad \text{(Eq. 34)}$$

where $s = j\omega$ so that $$Z_i = \left(\frac{1}{sc}\right)\left(\frac{1}{(1+\beta)}\right) \quad \text{(Eq. 35)}$$

$$Z_i = \frac{1}{[(1+\beta)c]s} \quad \text{(Eq. 36)}$$

It is readily observed that the capacity is reflected (multiplied) by $(1+\beta)$, as seen from the emitter.

For example, a .1 $\mu f$.—1.2 kv. capacitor is readily available in a small physical size, but a 10 $\mu f$.—1.2 kv. capacitor's size is prohibitive for most applications. By using the .1 $\mu f$.—1.2 kv. capacitor and a transistor whose beta $(\beta)$ is 100, the capacity presented to the emitter terminal is the 10 $\mu f$.—1.2 kv. desired.

Shown in FIG. 7 is an illustrative embodiment of a voltage regulator circuit in according with the present invention. As shown the circuit of FIG. 7 includes the pair of voltage input terminals 10 and 12; terminal 10 being the negative high voltage terminal. Similarly, the circuit has a pair of output voltage terminals 14 and 16 with terminal 14 being the negative output voltage terminal. As indicated, the voltage $E_i$ is impressed across the input terminals 10 and 12 and this input voltage is unregulated. Similarly, the output voltage $E_o$ is derived as the regulated output voltage from the terminals 14 and 16. Between the negative voltage input and output terminals 10 and 12 there is serially connected the PNP transistor Q1. As shown, the collector electrode of transistor Q1 is directly coupled with the input high voltage terminal 10. The emitter electrode of transistor Q1 is similarly directly coupled to the negative high voltage output terminal 14. Connected in parallel across the collector and emitter electrodes of transistor Q1 is the series combination of the resistor R1 and diode D1.

The diode D1 is a Zener diode and a combination of resistor R1 and Zener diode D1 serves the purpose of stabilizing the quiescent regulating current. A portion of this stabilized current provides base current for transistor Q2 which in turn provides base current for transistor Q1. The remaining portion of the stabilized current is shunted around the transistor combination Q2 and Q1 by the transistor Q3. It is this shunting action which is dependent on output voltage which provides regulation. In order for this regulating action to be optimum, it is necessary that the emitter voltage of transistor Q3 be stabilized at its quiescent voltage. This stabilization is obtained by placing a high capacity capacitor from the emitter of transistor Q3 to the common connected by terminals 12 and 16. In FIG. 7 the transistor capacitor combination 34 and C1 respectively, replace the high capacity, physically large and often expensive high capacitance capacitor by utilizing the previously described impedance transfer characteristics of the common base configuration which multiplies the capacitance of capacitor C1 to give an equivalent capacity from the emitter of transistor Q3 to the terminals 12 and 16 of $(1+\beta)C1$.

As shown in FIG. 7 another transistor Q2 which is also a PNP transistor is included in the circuit. As shown, the emitter electrode of transistor Q2 is directly coupled with the base of transistor Q1. The collector electrode of transistor Q2 is connected with the collector electrode of transistor Q1 by means of the resistor R2. The base of transistor Q2 is connected by means of another resistor R3, as shown to a junction between the resistor R1 and the Zener diode D1.

As shown, another transistor Q3 is included. The transistor Q3 being another PNP transistor. Its emitter electrode is coupled to the emitter electrode of transistor Q1 via the resistor R4 while the collector electrode of transistor Q3 is directly connected to the base electrode of transistor Q2.

As shown, there is connected across the output voltage terminals 14 and 16 in series: the resistor R5, potentiometer R6, resistor R7 and resistor R8. Also, there is coupled between the base electrode of transistor Q3 and resistor R6 another potentiometer R9. As shown, the capacitor C2 is connected between the output terminal 14 and the potentiometer R9.

Within the dotted lines shown in FIG. 7 there is illustrated the common base transistor configuration hereinbefore discussed (with reference to FIGS. 5 and 6) the regulation system according to the invention which employs the impedance transfer characteristic of the common base transistor configuration which multiplies the capacitance of a capacitor C1 connected to the base of a regulating transistor Q4. As shown, the transistor Q4 is an NPN type transistor having its emitter electrode directly coupled to the emitter electrode of transistor Q3. Connected in series between the base electrode of transistor Q4 and the high voltage terminals 12 and 16 is the relatively small capacity capacitor C1. As shown, the collector electrode of transistor Q4 is directly coupled between the resistors R7 and R8. Also, the base electrode of transistor Q4 coupled via resistor R10 to a point between the potentiometer R6 and resistor R7.

Although in FIG. 7 the particular values of the voltages, resistors, diode, capacitors, transistors, and potentiometers, has been indicated in the drawing figure it is to be understood that these specific ratings or values are for the purpose of illustrating a particular circuit embodying the invention and that such specificity is to be considered as illustrative of, rather than limitative of, the invention.

While a specific embodiment of the invention has been shown and described in detail to illustrate the application of the inventive principles involved it is to be understood that the invention may be otherwise embodied without departing from such principles.

What is claimed is:

1. A voltage regulator comprising: a pair of input terminals adaptable for having an unregulated input voltage impressed therebetween; a pair of output terminals between which a regulated output voltage is derivable; a first PNP transistor having a collector, an emitter and a base, the emitter and collector of said first PNP transistor being coupled to one of said output terminals and one of said input terminals, respectively, and the other PNP transistor having a collector, an emitter and a base, the base of said first PNP transistor being coupled to the emitter of said second PNP transistor; first impedance means comprising a resistor and Zener diode in series, said first impedance means being coupled in parallel between the collector and emitter of said first PNP transistor; second impedance means comprising a resistor, said second impedance means being coupled between the base of said second PNP transistor and to said first impedance means between said resistor and Zener diode, third impedance means comprising a resistor, said third impedance means being coupled between the collectors of said first and second PNP transistors; a third PNP transistor having a collector, an emitter and base, the collector of said third PNP transistor being coupled to the base of said second PNP transistor; fourth impedance means comprising a resistor, said fourth impedance means being coupled between the emitters of said first and third PNP transistors; a first NPN transistor having a collector, an emitter and a base, the emitters of said third PNP and first NPN transistors being coupled together; fifth impedance means coupled between said pair of output terminals, the base and collector of said third PNP and first NPN transistors being coupled to said fifth impedance means; and, sixth impedance means coupled between the base of said first NPN transistor and said other output terminal.

2. The voltage regulator according to claim 1 wherein said sixth impedance means is a capacitor.

3. The voltage regulator according to claim 1 further comprising a seventh impedance means comprising a resistor, said seventh impedance means being connected between said fifth impedance means and the base of said first NPN transistor.

4. The voltage regulator according to claim 1 further comprising eighth impedance means comprising a resistor to couple the base of the third PNP transistor to the fifth impedance means.

5. The voltage regulator according to claim 1 wherein said fifth impedance means is comprised of at least one resistor.

6. The voltage regulator according to claim 4 further comprising a ninth impedance means coupled between said one output terminal and said eighth impedance means.

7. The voltage regulator according to claim 6 wherein said ninth impedance means is comprised of a capacitor.

8. A voltage regulator comprising: a pair of input terminals adaptable for having an unregulated input voltage impressed therebetween; a pair of output terminals between which a regulated output voltage is derivable; a first transistor having a collector, an emitter and a base, the emitter and collector of said first transistor being coupled to one of said output terminals and one of said input terminals, respectively, and the other said input and output terminals being coupled together; a second transistor having a collector, an emitter and a base, the base of said first transistor being coupled to the emitter of said second transistor; first impedance means comprising a resistor and Zener diode in series, said first impedance means being coupled in parallel between the collector and emitter of said first transistor; second impedance means comprising a resistor, said second impedance means being coupled between the base of said second transistor and to said first impedance means between said resistor and Zener diode; third impedance means comprising a resistor, said third impedance means being coupled between the collectors of said first and second transistors; a third transistor having a collector, an emitter and base, the collector of said third transistor being coupled to the base of said second transistor; fourth impedance means comprising a resistor, said fourth impedance means being coupled between the emitters of said first and third transistors; fifth impedance means coupled between said pair of output terminals, the base of said third transistor being coupled to said fifth impedance means; and final means coupled to the emitter of the third transistor, the other of said output terminals and said fifth impedance means, said final means acting as a large capacitance.

9. The voltage regulator according to claim 8 wherein said final means is comprised of a fourth transistor having a collector, an emitter and a base, and a small capacity capacitor; said capacitor being connected between the fourth transistor's base and the other of said output terminals, the emitters of the third and fourth transistors being coupled together and the collector of the fourth transistor being coupled to said fifth impedance means.

10. The voltage regulator according to claim 9 further comprising another impedance comprising a resistor, said impedance being connected between the fourth transistor's base and said fifth impedance means.

11. The voltage regulator according to claim 10 wherein said first, second and third transistors are PNP transistors and said fourth transistor is an NPN transistor.

References Cited

UNITED STATES PATENTS

| | | | |
|---|---|---|---|
| 3,151,289 | 9/1964 | Harpley | 323—22(T) |
| 2,832,035 | 4/1958 | Bruck et al. | 323—22(T) |
| 2,889,512 | 6/1959 | Ford et al. | 323—22(T) |
| 2,897,430 | 7/1959 | Winkel | 323—22(T) |
| 2,984,779 | 5/1961 | Klees | 323—22(T) |
| 3,109,979 | 11/1963 | Faulkner et al. | 323—22(T) |

OTHER REFERENCES

Honeywell Application Notes, "Transistor Ripple Removal Filter," Mar. 15, 1959.

J D MILLER, Primary Examiner

G. GOLDBERG, Assistant Examiner

U.S. Cl. X.R.

323—38, 39